United States Patent
Chaiko (10) Patent No.: US 7,081,483 B2
(45) Date of Patent: Jul. 25, 2006

(54) POLYFUNCTIONAL DISPERSANTS FOR CONTROLLING VISCOSITY OF PHYLLOSILICATES

(75) Inventor: David J. Chaiko, Naperville, IL (US)

(73) Assignee: The University of Chicago, Chicago, IL (US)

( * ) Notice: Subject to any disclaimer, the term of this patent is extended or adjusted under 35 U.S.C. 154(b) by 292 days.

(21) Appl. No.: 10/452,818

(22) Filed: Jun. 2, 2003

(65) Prior Publication Data

US 2004/0014823 A1   Jan. 22, 2004

Related U.S. Application Data

(63) Continuation-in-part of application No. 09/898,529, filed on Jul. 30, 2001, now abandoned.

(51) Int. Cl.
B01F 3/12 (2006.01)

(52) U.S. Cl. .................................................... 516/98
(58) Field of Classification Search ................ 516/98
See application file for complete search history.

(56) References Cited

U.S. PATENT DOCUMENTS

| | | | |
|---|---|---|---|
| 2,353,166 A | 7/1944 | Lanz et al. | |
| 2,479,061 A | 8/1949 | Denton | |
| 3,266,923 A | 8/1966 | Morway et al. | |
| 3,490,535 A | 1/1970 | Messenger | |
| 3,508,682 A | 4/1970 | Hollis et al. | |
| 3,615,811 A | 10/1971 | Barrett | |
| 3,839,389 A | 10/1974 | Neumann | |
| 4,105,578 A | 8/1978 | Finlayson et al. | |
| 4,196,104 A * | 4/1980 | Oguagha | 510/330 |
| 4,208,218 A | 6/1980 | Finlayson | |
| 4,365,030 A | 12/1982 | Oswald et al. | |
| 4,382,868 A | 5/1983 | House | |
| 4,434,075 A | 2/1984 | Mardis et al. | |
| 4,810,734 A | 3/1989 | Kawasumi et al. | |
| 4,816,517 A | 3/1989 | Wilkus et al. | |
| 4,857,226 A | 8/1989 | Drapier et al. | |
| 5,091,193 A | 2/1992 | Enjolras et al. | |
| 5,223,179 A * | 6/1993 | Connor et al. | 134/25.2 |
| 5,243,021 A * | 9/1993 | Langer et al. | 528/272 |
| 5,281,357 A * | 1/1994 | Morgan et al. | 510/393 |
| 5,336,647 A | 8/1994 | Nae et al. | |
| 5,412,118 A * | 5/1995 | Vermeer et al. | 510/127 |
| 5,482,693 A | 1/1996 | Rushmere et al. | |
| 5,565,145 A * | 10/1996 | Watson et al. | 510/350 |
| 5,582,638 A | 12/1996 | Coutelle et al. | |
| 5,719,117 A * | 2/1998 | Falk et al. | 510/475 |
| 6,074,473 A | 6/2000 | Nichols et al. | |
| 6,103,817 A | 8/2000 | Usuki et al. | |
| 6,262,162 B1 | 7/2001 | Lan et al. | |
| 6,271,298 B1 | 8/2001 | Powell | |
| 6,383,282 B1 | 5/2002 | Chaiko | |
| 6,632,868 B1 | 10/2003 | Qian et al. | |
| 6,759,463 B1 | 7/2004 | Lorah et al. | |
| 6,790,896 B1 | 9/2004 | Chaiko | |
| 6,822,035 B1 | 11/2004 | Chaiko | |
| 6,841,226 B1 | 1/2005 | Dontula et al. | |
| 6,864,308 B1 | 3/2005 | Rosenthal et al. | |

OTHER PUBLICATIONS

Hawley's Condensed Chemical Dictiionary, Eleventh Ed., edited by Sax and Lewis, Sr. (Van Nostrand Reinhold Company, New York, NY, copyright 1987), Oct. 1989, p. 300.

Gray, Compositions and Properties of Oil Well Drilling Fluids, Fourth Ed. (Gulf Publishing Company, Houston, TX, copyright 1980) Oct. 1981, pp. 132, 541, and 563.

* cited by examiner

Primary Examiner—Randy Gulakowski
Assistant Examiner—Timothy J. Kugel
(74) Attorney, Agent, or Firm—Foley & Lardner LLP (57) ABSTRACT

This invention provides phyllosilicates and polyfunctional dispersants which can be manipulated to selectively control the viscosity of phyllosilicate slurries. The polyfunctional dispersants used in the present invention, which include at least three functional groups, increase the dispersion and exfoliation of phyllosilicates in polymers and, when used in conjunction with phyllosilicate slurries, significantly reduce the viscosity of slurries having high concentrations of phyllosilicates. The functional groups of the polyfunctional dispersants are capable of associating with multivalent metal cations and low molecular weight organic polymers, which can be manipulated to substantially increase or decrease the viscosity of the slurry in a concentration dependent manner. The polyfunctional dispersants of the present invention can also impart desirable properties on the phyllosilicate dispersions including corrosion inhibition and enhanced exfoliation of the phyllosilicate platelets.

12 Claims, 3 Drawing Sheets

POLYFUNCTIONAL DISPERSANTS FOR CONTROLLING VISCOSITY OF PHYLLOSILICATES

RELATED APPLICATIONS

This application is a continuation in part of U.S. patent application Ser. No. 09/898,529, filed Jul. 3, 2001 now abandoned.

GOVERNMENT RIGHTS

This invention was made with Government support under Contract No. W-31-109-ENG-38 awarded by the U.S. Department of Energy. The Government has certain rights in this invention.

FIELD OF THE INVENTION

The present invention relates to novel rheology control agents. More particularly this invention provides rheology control agents comprising a phyllosilicate and polyfunctional dispersants and methods for controlling the viscosity of a liquid using these rheology control agents.

BACKGROUND OF THE INVENTION

Phyllosilicates (e.g., montmorillonites, hectorite, saponite, etc.) and synthetic phyllosilicates (e.g., LAPONITE) are used as rheology control agents in a number of applications such as paints, drilling fluids, adhesives, greases, cosmetics, foods, pharmaceuticals, inks, etc. The thickening ability of natural and synthetic smectites is due to the interactions between the phyllosilicate platelets that lead to a "house of cards" structure. The association of phyllosilicate particles occurs primarily through edge/edge interactions which generate ribbon-like microstructures. Because these particle/particle interactions are relatively weak, the colloidal structure of the phyllosilicate particles is easily disrupted by shear forces, leading to time-and shear-dependent rheology, or thixotropy. Thixotropic rheology is desirable in numerous applications. For example, thixotropy in coatings imparts high viscosity, thereby preventing pigment settling, but permits easy flow of the coating during application. The time dependent behavior of the viscosity enables film leveling but prevents sag.

Due to their extremely small particle size, smectites can be very efficient thickening agents. For example, phyllosilicate concentrations as low as 0.4 to 0.8 weight percent weight percent are sufficient to build acceptable viscosity in latex paints. Aqueous dispersions at solids concentrations as low as 4 to 8 weight percent produce highly viscous pastes. Even at these low solid concentrations the high viscosity build severely limits the concentrations at which smectite slurries can be handled during, for example, beneficiation processes.

Accordingly, the use of dispersing agents to limit viscosities in phyllosilicate slurries is well known. Examples of some inorganic dispersants that have found wide use in phyllosilicate processing applications include tetrasodium pyrophosphate (TSPP), sodium tripolyphosphate (STPP), hexametaphosphate, and sodium silicate. These materials function primarily through adsorption at the edges of phyllosilicate platelets, but can also complex multi-charged cations such as calcium and magnesium which can otherwise lead to phyllosilicate flocculation. Organic dispersing agents such as tannates, humates, and synthetic polymers such as polyacrylates, polyethylene oxide, polyvinyl alcohol, etc. function by preventing particle/particle interactions through steric repulsion.

The use of organophosphorus reagents as dispersants of synthetic phyllosilicates is known in the art. Organophosphorous reagents include phosphonic acids, phosphinic acids, thiophosphinic acids, diesters of phosphorous acid, diesters of phosphoric acid, and diphosphonic acids. These dispersants permit highly concentrated suspensions of synthetic phyllosilicates to be prepared that exhibit extremely low viscosities. Additionally, these dispersants do not appear to interfere with the effectiveness of the synthetic phyllosilicate as a thickening agent in finished products such as paints.

Although dispersants reduce the viscosity of phyllosilicate slurries, current dispersants do not provide phyllosilicate compositions with other desirable properties including corrosion inhibition and the ability to selectively control the viscosity of a phyllosilicate dispersion. Additionally, the prior art use of organophosphorous dispersants is disadvantageous because these dispersants interfere with the generation of high viscosity dispersions in nonaqueous systems. It is believed that organophosphorous dispersants interfere with edge-edge interactions of the phyllosilicate particles which are theorized to be responsible for increased viscosity.

Objects and advantages of the present invention will become apparent by review of the detailed description of preferred embodiments.

SUMMARY OF THE INVENTION

The present invention provides combinations of phyllosilicates and polyfunctional dispersants that are useful as rheological control agents. Phyllosilicates used in conjunction with polyfunctional dispersing agents permit the formation of high concentration phyllosilicate slurries with manageable viscosity. Substantial increases or decreases in the viscosity of the phyllosilicate slurry containing polyfunctional dispersants can be obtained by addition of multivalent cations or cationic low molecular weight polymers to the slurry. Both the polyfunctional dispersants and the salts which provide the multivalent cations can impart corrosion inhibiting properties to the phyllosilicate slurry. The polyfunctional dispersants also improve the dispersability and exfoliation of phyllosilicate platelets in polymer matrices. The present invention also provides a process for preparing organically modified phyllosilicates incorporating polyfunctional dispersants which provide improved dispersion of phyllosilicates in nonaqueous compositions.

The above described objects and embodiments are set forth in the following description and illustrated in the drawings described hereinbelow.

DETAILED DESCRIPTION OF THE PREFERRED EMBODIMENTS

This invention relates to the use of polyfunctional dispersants in controlling the viscosity of aqueous and nonaqueous phyllosilicate slurries and dispersions. The invention also relates to the use of polyfuctional dispersants to achieve more complete exfoliation of the dispersed phyllosilicates. Additionally, this invention relates to the use of polyfunctional dispersants to achieve more complete exfoliation of organically-modified phyllosilicates in nonaqueous systems. "Polyfunctional" as used in the instant application refers to dispersants that have three or more functional groups, such as phytic acid (a metal ion chelator with six functional groups per molecule). Preferably, the polyfunctional dispersants of the present invention are chelators and have at least three functional groups per molecule. Without limiting the scope of the present invention, it is believed that the polyfunctional dispersants described herein display an ability to adsorb on the edges of phyllosilicate particles through chelating action of the functional groups.

Advantages realized by the present invention include, at least, improving the dispersability of phyllosilicates so that phyllosilicates, including smectite ores, can be beneficiated at high dispersed solid concentrations. The viscosity of phyllosilicate dispersions can be controlled through the use of bridging ions in conjunction with polyfunctional dispersants and corrosion inhibiting properties can be imparted to nonaqueous phyllosilicate dispersions utilizing the present invention. Nanocomposites can also be more readily produced by methods which improve the dispersability of phyllosilicates in polymers according to the present invention.

A broad range of phyllosilicates can be used in the present invention and include natural phyllosilicates, synthetic phyllosilicates, surface-modified phyllosilicates and combinations thereof. Natural phyllosilicates suitable for use in the present invention include, without limitation, talc, mica, kaolin clays, smectite clays, and subgroups thereof including hectorite, montmorillonite, beidellite, stevensite, and saponite clays. Additionally, synthetic phyllosilicates, such as for example LAPONITE, can also be used in the present invention. Phyllosilicates which are naturally hydrophobic such as talc, mica, together with phyllosilicates which have been surface-modified to become hydrophobic or organophilic are also suitable for use in the present invention.

The polyfunctional dispersants of the present invention produce viscosity reductions comparable to prior art dispersants. Due to the viscosity reduction provided by the polyfunctional dispersants, utilizing a polyfunctional dispersant at a low concentration, typically about one to three weight percent relative to the phyllosilicate concentration, allows beneficiation of hectorite at concentrations of up to about 10 to 15 weight percent and montmorillonites and saponites at concentrations of up to about 25 to 30 weight percent using a pseudophasic extraction process. Although, these ranges are preferred in the present invention, a person of ordinary skill in the art will realize that any of these ranges include their subranges which fall within the scope of the present invention. Specifically, a person of ordinary skill in the art will realize that less dispersant is required when less phyllosilicate is being beneficiated. A preferred example of a polyfunctional dispersant is the sodium salt of phytic acid [myo-inositol hexakis(sodium phosphate)]. Phytic acid is a naturally occurring phytochemical that is used in cosmetics and is found in many foods. The sodium salt of phytic acid is an excellent chelator of +2 and +3 cations, is much more resistant to hydrolysis than inorganic polyphosphates (e.g., TSPP and STPP), and is readily biodegradable. Where biodegradability of the phytic acid dispersant is undesirable, sulfur analogues of phytic acid and its alkali salts can be used.

Polyfunctional dispersants suitable for use in the present invention include at least trifunctional, tetrafunctional, pentafunctional and hexafunctional dispersants. Preferred dispersants include:

a) trifunctional dispersants with the formula:

wherein X is selected from the group consisting of COOH, $PO_2H_2$, $PO_3H_2$ and alkali salts thereof;

b) tetrafunctional dispersants with the formula:

wherein X is selected from the group consisting of COOH, $PO_2H_2$, $PO_3H_2$ and alkali salts thereof;

c) tetrafunctional dispersants with the formula:

wherein X is selected from the group consisting of COOH, $PO_2H_2$, $PO_3H_2$ and alkali salts thereof;

d) tetrafunctional dispersants with the formula:

wherein X is selected from the group consisting of COOH, $PO_2H_2$, $PO_3H_2$ and alkali salts thereof, and Y is selected from the group consisting of H and OH;

e) pentafunctional dispersants with the formula:

wherein X is selected from the group consisting of COOH, $PO_2H_2$, $PO_3H_2$ and alkali salts thereof; and f) hexafunctional dispersants with the formula wherein Z is selected from the group consisting of $PO_3H_2$, $SO_3H_2$ and alkali salts thereof. Combinations of these dispersants may also be used in the present invention. The phosphonate derivative and sodium salt of a) are available as DEQUEST® 2000 and DEQUEST® 2006, respectively, from Solutia, Inc., St. Louis, Mo. The carboxylic acid derivative and sodium salt of b) are available from Aldrich, Milwaukee, Wis. The pentasodium salt and the of the phosphonate derivative and the H form of b) are available as DEQUEST® 2046 and DEQUEST® 2041, respectively, from Solutia, Inc., St. Louis, Mo. The potassium salt of c) is available as DEQUEST® 2054 from Solutia, Inc., St. Louis, Mo. The phosphonate derivatives and sodium salts of e) are available as DEQUEST® 2060-S and DEQUEST® 2066 and 2066-A, respectively, from Solutia, Inc., St. Louis, Mo. The phosphonate derivative of f) is available from Aldrich, Milwaukee, Wis. Other dispersants with the formulas a)–f) can be readily synthesized by one of skill in the art and are further discussed in "Metal Chelates of Phosphonate-Containing Ligands" by E. N. Rizkalla, Reviews in Inorganic Chemistry, Vol. 5 No. 3, 1983, pp. 224–304.

The polyfunctional dispersants may be used in combination with one another or in combination with monofunctional and bifunctional dispersants known in the art. Additionally, the dispersants may be used as the free acids, or as their salts, non-limiting examples of which include ammonium, and preferably their alkali salts which include lithium, sodium, potassium, rubidium, and cesium.

The polyfunctional dispersants may also be used to improve the dispersion and exfoliation of organoclays in polymer systems and for the preparation of nanocomposites.

Preferred polyfunctional dispersants for use in the present invention are the phosphonic acids ethylenediamine tetra (methylene phosphonic acid), hexamethylenediamine tetra (methylene phosphonic acid), diethylenetriamine penta(methylene phosphonic acid), amino tri(methylene phosphonic acid), N-(2-hydroxyethyl)ethylenedinitrilotetris(methylene phosphonic acid),ethylenedinitrilotetrakis(methylene phosphonic acid), 1,6-hexamethylenedinitrlotetrakis (methylene phosphonic acid), 1,2-cyclohexane-dinitrilotetrakis (methylene-phosphonic acid), and oxybis(ethylenetrilobis(methylene-phosphonic acid). The alkali salts of the dispersants and their combinations are also preferred polyfunctional dispersants. These polyfunctional organophosphorous reagents are expected to function similar to phytic acid providing desirable viscosity control of phyllosilicate slurries.

The phyllosilicates and polyfunctional dispersants of the present invention afford a degree of control over the viscosity of phyllosilicate slurries that is not obtainable with conventional dispersants. Unexpectedly, addition of a viscosity modifier, such as multivalent cations or cationic low molecular weight polymers, preferably having molecular weights of up to about 1000 or 2000 (i.e. up to about 750, 750 to 1500, 1500 to 2000, up to about 1000, 1000 to 2000, or the like), to the phyllosilicate slurries containing polyfunctional dispersant can be used to greatly increase or decrease the viscosity of the slurry in a manner dependent on the concentration of the viscosity modifier. Low molecular weight cationic polymers useful in the invention include those containing multiple quaternary amines or, at pHs below 8, teriary amines.

Without limiting the scope of the present invention, it is believed that that multivalent cations in the presence of polyfunctional dispersants form bridging networks between functional groups of adjacent polyfunctional dispersant molecules. Prior art dispersants, for example diphosphonic acids such as 1-hydroxyethylene-1,1-diphosphinic acid (HEDPA), do not show this cation bridging effect because the chelating groups in the molecule are believed to be oriented toward the surface of the phyllosilicate leaving no functional groups available for bridging or to function as a corrosion inhibitor. In contrast, the polyfunctional dispersants of the invention, particularly those with four or more functional groups, have sufficient groups to be bridged by multivalent cations or certain organic compositions and also function as corrosion inhibitors, presumably because they have unassociated functional groups.

The polyfunctional dispersants of the present invention, and in particular sodium phytate, react differently than prior art bifunctional dispersants in the presence of water soluble salts of multivalent cations (non-limiting examples of which are +2, +3 or +4 cations, e.g., $Ca^{2+}$, $Mg^{2+}$, $Zn^{2+}$, $Al^{3+}$ and $Zr^{4+}$). The addition of multivalent bridging cations to phyllosilicate slurries at molar ratios of about 0.6 to about 3 (i.e. 0.6 to 1.4, 1.4 to 2.2 or 2.2 to 3) relative to phytic acid (i.e., the molar ratio at which 20 to 50 mole percent of the phosphates in phytic acid become associated with multivalent cations) produces a maximum in viscosity, and is sufficient to induce gelation at phyllosilicate concentrations as low as about 1 to 2 weight percent. Complete conversion of all functional groups to the metal salt, wherein substantially all of the functional groups of the polyfunctional dispersant are associated with multivalent cations, disrupts the bridging between phyllosilicate particles and redispersion of the phyllosilicate occurs. The cation concentrations at which gelation takes place are approximately 100 times higher than the solubilities of mineral phases such as calcite and dolomite (sources of calcium and magnesium) at the alkaline pH in which clay beneficiation is carried out. Thus phyllosilicate ores containing these mineral impurities can be processed at high solids concentrations with low viscosity. In addition, the solubilities of typical paint pigments (e.g., $TiO_2$, $ZnO$, $Fe_3O_3$) are low enough to have no effect on phyllosilicate viscosity. This permits pigment dispersion during paint formulation at low viscosity even in the presence of the phyllosilicate thickener, thereby producing significant energy and cost savings. Low molecular weight cationic polymers can also induce gelation in phyllosilicate compositions.

The phyllosilicate slurries including polyfunctional dispersants provided by the present invention are useful for controlling the rheology of greases, paints, and other slurries based on phyllosilicates. With paint formulations, the polyfunctional dispersant could be used to thicken the paint and normally would not be used to induce gelation.

The bridging cations can be supplied by salt addition to either the phyllosilicate slurry or finished product or by pH adjustment in the presence of small amounts of pH sensitive minerals such as calcite, dolomite, and magnesite (magnesium carbonate). These minerals do not affect viscosity at pH greater than about 9 to 9.5, but at lower pH (e.g. about 7 or below) the mineral solubility is high enough to supply the necessary amounts of bridging cations to induce gelation. Other possible sources of bridging ions active at high pH (above 7, preferably above 8, and more preferably about 9–9.5 or above) include the calcium, magnesium, aluminum, zirconium and zinc salts of acetate, nitrate, nitrite, molybdate, chromate, tungstate and pertechnate. Those skilled in the art will understand that the water solubilities of such metal salts vary depending on the conditions of the phyllosilicate slurry (e.g. pH, concentration of other ions present, and the like). Thus, it will be recognized that the effective amount of a metal salt or other viscosity modifier necessary to control viscosity in the presence of a polyfunctional dispersant may be readily determined through routine experimentation, guided by the disclosure herein.

Organophilic phyllosilicates, as exemplified by U.S. Pat. Nos. 3,839,389, 4,105,578, 4,208,218, 4,365,030, and 5,336,647, incorporated herein by reference, are produced by the exchange of high molecular weight ammonium ions having at least one alkyl chain of sufficient length to impart hydrophobicity to the phyllosilicate surface. These organophilic phyllosilicates are known to be excellent thickeners of certain organic liquids. It is also well known that maximum thickening efficiency is achieved by the addition of low-molecular-weight polar compounds such as methanol, ethanol, acetone or propylene carbonate, in combination with water, at approximately 10 to 30 weight percent of the organophilic phyllosilicate. Without limiting the scope of the present invention, the polar activator is believed to solvate the onium ion at the surface of the phyllosilicate and untangle the hydrocarbon chains of the organic cations. However, organophilic phyllosilicates are not compatible with organophilic surfactants like dinonylnaphthalene sulfonic acid (HDNNS), oleic acid, linoleic acid, stearic acid, and their salts, non-limiting examples of which are lithium stearate, calcium stearate, zinc stearate, aluminum stearate, calcium oleate, lead naphthenate, calcium dinonylnaphthalene sulfonate, high-molecular-weight alcohols like stearyl alcohol, and petroleum sulfates like sodium lauryl sulfate. Addition of these high molecular weight surfactants leads to loss of viscosity. This makes it difficult to incorporate common corrosion inhibitors, like HDNNS and its salts, in organophilic phyllosilicate thickened greases.

Surprisingly, the use polyfunctional dispersants overcomes this problem and enables the preparation of organophilic phyllosilicates incorporating high molecular weight surfactant corrosion inhibitors, including those mentioned above, that also function as a new class of polar activator. Water/ethanol solutions containing about 1 to 3 (i.e. 1 to 1.7, 1.7 to 2.4, 2.4 to about 3) weight percent multivalent metal salts at levels of about 10 to 30 weight percent (i.e. 10 to 17, 17 to 24 or 24 to 30) of the organophilic phyllosilicate function as normal polar activators and also provide enhanced gel formation due to cationic bridging. Salt anions, such as molybdate, acetate, nitrite, pertechnate, chromate, and tungstate, in addition to the polyfunctional dispersant itself, provide additional corrosion protection, and can be combined with the use of organophilic phyllosilicates in the preparation of greases and lubricants. Therefore the organophilic phyllosilicates containing polyfunctional dispersants of the present invention have particular value in modifying the viscosity of organic liquids by exhibiting both viscosity control and corrosion inhibitor properties.

Using a polyfunctional dispersant during phyllosilicate purification and subsequent surface modification with high molecular weight quaternary amines provides a new class of polar activator for organophilic phyllosilicates. Dilute solutions of corrosion inhibiting salts could be used to simultaneously incorporate corrosion protection and viscosity build in products such as greases, lubricants, heat transfer fluids, and the like.

Polyfunctional dispersants can also be used to enhance the ease of dispersion of phyllosilicates in solvent systems. Surprisingly, polyfunctional dispersants have been found to be especially advantageous for the purpose of dispersing and exfoliating phyllosilicates in polymers, particularly low molecular weight, hydrophobic polymers. It has also been unexpectedly discovered that the viscosity of phyllosilicate/polymer dispersions can be reduced by increasing the temperature of the dispersion. Therefore the organophilic phyllosilicates containing polyfunctional dispersants of the present invention have particular value in the preparation of phyllosilicate/polymer nanocomposites.

Although the invention is not limited hereby, it is theorized that polyfunctional dispersants are effective at dispersing the phyllosilicate in a hydrophobic polymer because the functional groups of the polyfunctional dispersant are able to interact directly with the polymer matrix through hydrogen bonding. Accordingly, the use of polyfunctional dispersants should be particularly well suited for the complete dispersion and exfoliation of phyllosilicates in hydrophobic polymer systems when the polymer contains electronegative atoms capable of acting as a hydrogen bond acceptor. Based on this theory it is believed that heating is sufficient to break the hydrogen bonding between the polyfunctional dispersant and the polymer thereby reducing the viscosity of phyllosilicate/polymer dispersion.

Further aspects of the invention are described in the following non-limiting examples:

EXAMPLE 1

This example shows that bifunctional dispersants are not influenced by the presence of +2 or +3 cations. A hectorite ore containing impurities of calcite and dolomite was dispersed in deionized water at a solids concentration of 10 weight percent at pH 9 with 3 weight percent (relative to the weight of phyllosilicate ore) sodium salt of HEDPA. The ore was beneficiated using the pseudophasic extraction process by sequential addition of polyethylene glycol and polypropylene glycol followed by centrifugation. The viscosity of the slurry was between 1 and 10 mPa s. The concentration of hydrophilic phyllosilicate in the product was 10.7 weight percent. Addition of either calcium acetate or aluminum nitrate at concentrations equal to 50 mole percent of the phosphonate content had no effect on the viscosity of the slurry.

EXAMPLE 2

This example shows the effect of bridging ions on the viscosity of phyllosilicate slurries dispersed with a polyfunctional dispersant. The hectorite ore of Example 1 was dispersed in deionized water at a solids concentration of 10 weight percent at pH 9 with 3 weight percent (relative to the weight of phyllosilicate ore) sodium salt of phytic acid. The ore was beneficiated using the pseudophasic extraction process by sequential addition of polyethylene glycol and polypropylene glycol followed by centrifugation. The viscosity of the slurry was between 1 and 10 mPa s. The concentration of hydrophilic phyllosilicate in the product was 10.5 weight percent. Addition of either calcium acetate or aluminum nitrate at concentrations equal to 50 mole percent of the phosphonate content caused immediate gelation producing a viscosity in excess of 10,000 mPa s.

EXAMPLE 3

This example shows the effect of bridging ions on the viscosity of phyllosilicate slurries dispersed with a polyfunctional dispersant. A saponite ore containing calcite and dolomite as the major impurities was dispersed in deionized water at a solids concentration of 15 weight percent at pH 7 and with 3 weight percent (relative to the weight of phyllosilicate ore) sodium salt of phytic acid. The viscosity of the resulting slurry was in excess of 1,000 mPa s. Calcium and magnesium ions being supplied by partial dissolution of the calcite and dolomite at pH 7 were sufficient to cause gelation.

EXAMPLE 4

This example shows the effect of high pH on the viscosity of phyllosilicate slurries dispersed with a polyfunctional dispersant. The saponite of Example 3 was dispersed in deionized water at a solids concentration of 25 weight percent at pH 9.5 and with 3 weight percent (relative to the weight of phyllosilicate ore) sodium salt of phytic acid. The viscosity of the resulting slurry was between 1 to 10 mPa s. Significant dissolution of the calcite and dolomite was inhibited by the high pH, thereby producing the low viscosity.

EXAMPLE 5

To demonstrate that the dispersants do not adversely affect the viscosity of multicomponent systems such as paints, samples were prepared using the following exterior latex paint formulation (adapted from a Union Carbide formulation):

| Grind (1800 rpm, 20 min.): | |
| --- | --- |
| Water | 20.2 wt % |
| TAMOL 736 | 0.91 |
| TRITON X-100 (polyoxyethylene octyl phenyl ether) | |
| AMP-95 (2-amino- | 0.18 |

| -continued | |
| --- | --- |
| 2-methyl-propanol) | |
| Propylene glycol | 0.09 |
| NOPCO NDW (sulfonated castor oil) | 2.4 |
| TiO$_2$ | 0.18 |
| ZnO | 15.9 |
| Mica | 2.2 |
| Talc | 2.2 |
| Rheology Aid | 9.1 |
| | 1.0 |
| Let Down (400 rpm, 5 min.): | |
| ROPAQUE OP-62 (opaque non-film forming aqueous acrylic-styrene emulsion polymer) | 9.3 wt % |
| UCAR Latex 367 ® | 34.7 |
| UCAR Filmer IBT ® | 0.91 |

The viscosity data for examples (b) and (d) in Table I illustrate the stability of the paint viscosity with time and also show that the presence of the dispersant prevents viscosity build in a latex paint formulation.

EXAMPLE 6

This example shows the effect of polyfunctional dispersants on the dispersion and exfoliation of an organoclay in a hydrophobic polymer matrix. A saponite ore was dispersed in deionized water at a solids concentration of 10 weight percent at pH 9 with 3 weight percent (relative to the weight of phyllosilicate ore) aminotri (methylene-phosphonic acid), pentasodium salt (trade name DEQUEST 2006, Solutia Inc., St. Louis, Mo.). The ore was beneficiated using the pseudophasic extraction process by sequential addition of polyethylene glycol and polypropylene glycol followed by centrifugation. The hydrophilic organoclay was then further treated with a quaternary ammonium compound to produce a hydrophobic organoclay. The beneficiated clay slurry was heated to 60° C. and combined with methyl bis(2-hydroxyethyl) tallow ammonium chloride (trade name VARISOFT 920, Goldschmidt Chemical Corp., Janesville, Wis.). The mixture was stirred for 60 minutes, filtered, washed with deionized water, dried at 50° C., and finely ground to minus 100 mesh powder. The organophilic organoclay contained 90 mequilivants of quaternary amine per 100 grams of clay. The majority of the polyethylene glycol on the clay was replaced by the quaternary amine during the cation exchange process.

Figure 1:
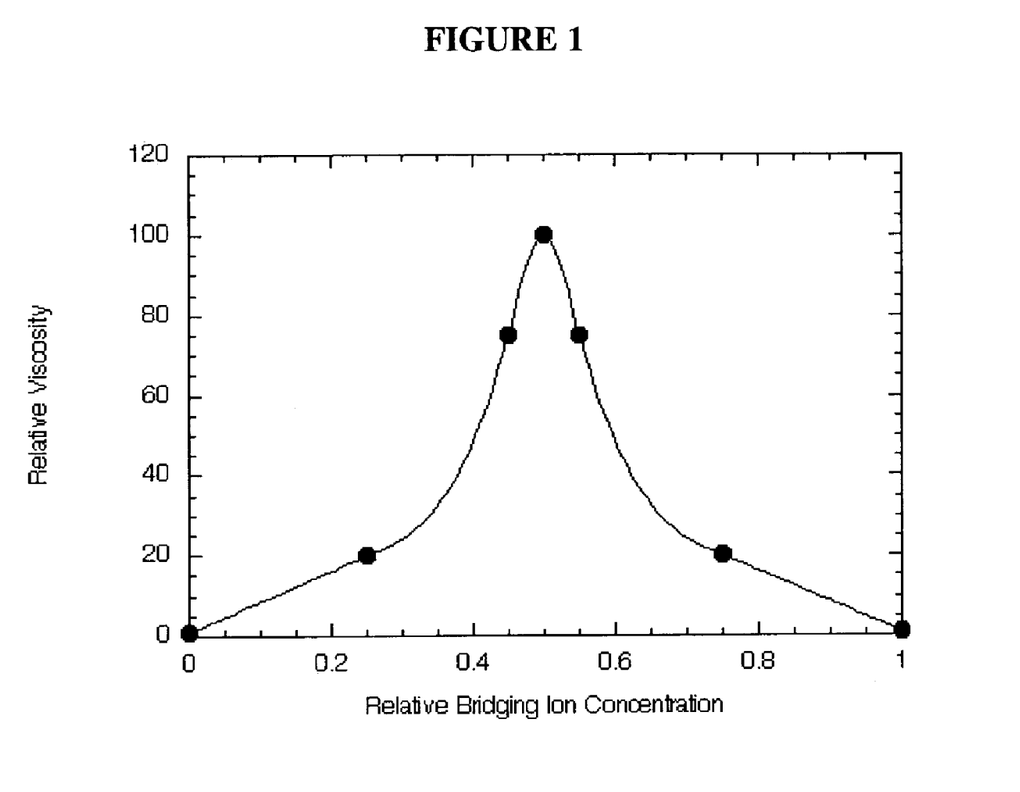
FIG. 1 is a plot of relative viscosity as a function of bridging ion concentration.
Figure 2:
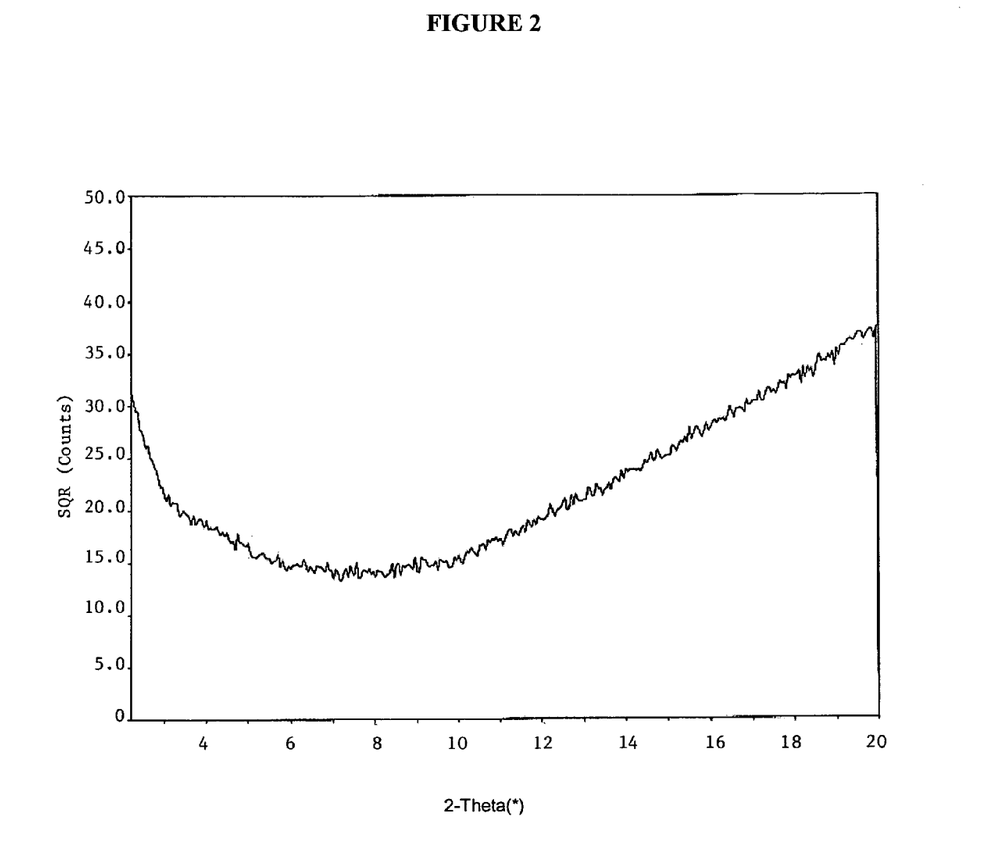
FIG. 2 is an x-ray diffraction pattern of an organoclay dispersion in Voranol® incorporating a polyfunctional organophosphorus dispersant.

The ground organoclay was dispersed in a hydrophobic polyol comprised of polyethylene glycol-block-polypropylene glycol-block-polyethylene glycol (trade name VARANOL, Dow Chemical Co., Midland, Mich.). The ground organoclay was dispersed in the polyol at a concentration of 10 wt %. The degree of swelling and interlayer distance between the organoclay particles was measured by x-ray diffraction and showed the absence of a basal spacing indicating that the organoclay was exfoliated. The lack of basal spacing is illustrated in FIG. 2. The high degree of clay dispersion is believed to be due to the formation of hydrogen bonds between the uncomplexed phosphonate groups of the dispersant at the clay edge with the ether oxygens of the polyol. In addition, the viscosity of the organoclay dispersion was significantly reduced upon heating and suggests that hydrogen bonding plays a significant role in dispersion formation. This behavior is a significant departure from the behavior of traditional organoclay dispersions in nonaqueous media which retain their high viscosity at elevated temperatures and which forms the basis for the production of high temperature greases. Without limiting the scope of the invention, it is believed that as hydrogen bonds are broken with increasing temperature, the hydrogen bond bridge between the clay and the polyol is broken and thus results in a reduction of viscosity.

EXAMPLE 7

This example shows that bifunctional dispersants are not as efficient as polyfunctional dispersants in promoting dispersion of organoclays in hydrophobic systems due to the lack of free functional groups capable of forming hydrogen bonds. The saponite ore of Example 5 was dispersed in deionized water at a solids concentration of 10 weight percent at pH 9 with 3 weight (relative to the weight of the phyllosilicate ore) sodium salt of hydroxyethane-1,1-diphosphonic acid. The ore was beneficiated using the pseudophasic extraction process by sequential addition of polyethylene glycol and polypropylene glycol followed by centrifugation. The hydrophilic organoclay was then further treated with a quaternary ammonium compound to produce a hydrophobic organoclay. The beneficiated clay slurry was heated to 60° C. and combined with methyl bis(2-hydroxyethyl) tallow ammonium chloride (trade name Varisoft 920, Goldschmidt Chemical Corp., Janesville, Wis.). The mixture was stirred for 60 minutes, filtered, washed with deionized water, dried at 50° C., and finely ground to minus 100 mesh powder. The organophilic organoclay contained 90 mequilivants of quarternary amine per 100 grams of clay. The majority of the polyethylene glycol on the clay was replaced by the quarternary amine during the cation exchange process. The ground organoclay was dispersed in a hydrophobic polyol comprised of polyethylene glycol-block-polypropylene glycol-block-polyethylene glycol (trade name Voranol, Dow Chemical Co, Midland, Mich.).

Figure 3:
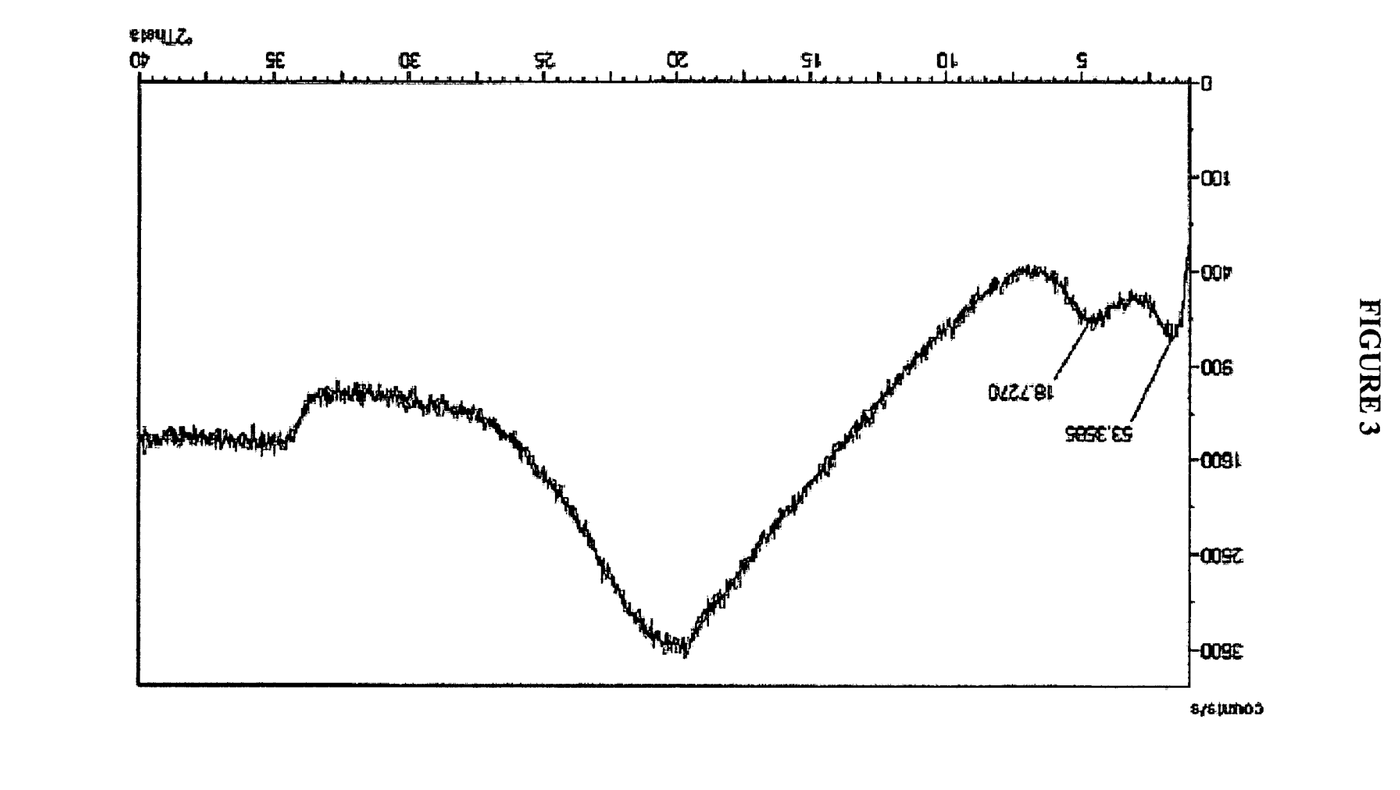
FIG. 3 is an x-ray diffraction pattern of an organoclay dipersion in Voranol® incorporating a bifunctional organophosphorus dispersant.

The ground organoclay was dispersed in the polyol at an organoclay concentration of 10 weight percent. The degree of swelling and interlayer distance between the organoclay particles was measured by x-ray diffraction and in contrast to the results of Example 6, this time the x-ray diffraction pattern (FIG. 3) showed a combination of d(001) basal spacings of 53.3 Å and 18.7 Å indicating incomplete dispersion and lack of exfoliation. In addition, the polyol dispersion was a stiff gel which, like traditional organoclay greases, did not exhibit a reduction in viscosity upon heating.

While preferred embodiments have been illustrated and described, it should be understood that changes and modifications can be made therein in accordance with one of ordinary skill in the art without departing from the invention in its broader aspects. Furthermore, one skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All references cited herein are hereby incorporated by reference in their entirety. Various features of the invention are defined in the following claims.

What is claimed is:

1. A rheology control agent comprising a phyllosilicate, a polyfunctional dispersing agent, an effective amount of a viscosity modifier, and a solvent, wherein the viscosity modifier is a source of multivalent cations, about 20 to about 50 percent of the functional groups of the polyfunctional dispersing agent are associated with cations, and the polyfunctional dispersing agent and the effective amount of the viscosity modifier together are capable of raising the viscosity of a slurry or dispersion of the phyllosilicate.

2. The rheology control agent of claim 1 wherein the phyllosilicate is selected from the group consisting of natural phyllosilicates, synthetic phyllosilicates, surface-modified phyllosilicates and combinations thereof.

3. The rheology control agent of claim 1 wherein the polyfunctional dispersing agent is selected from the group consisting of:
(a) a trifunctional dispersant with the formula:

wherein X is selected from the group consisting of COOH, $PO_2H_2$, $PO_3H_2$ and salts thereof;
(b) a tetrafunctional dispersant with the formula:

wherein X is selected from the group consisting of COOH, $PO_2H_2$, $PO_3H_2$ and salts thereof
(c) tetrafunctional dispersants with the formula:

wherein X is selected from the group consisting of COOH, $PO_2H_2$, $PO_3H_2$ and alkali salts thereof;
(d) a tetrafunctional dispersant with the formula:

wherein X is selected from the group consisting of COOH, $PO_2H_2$, $PO_3H_2$ and salts thereof, and Y is selected from the group consisting of H and OH;

(e) a pentafunctional dispersant with the formula:

wherein X is selected from the group consisting of COOH, $PO_2H_2$, $PO_3H_2$ and salts thereof;

(f) a hexafunctional dispersant with the formula:

wherein Z is selected from the group consisting of $PO_3H_2$, $SO_3H_2$ and salts thereof; and (g) combinations thereof.

4. The rheology control agent of claim 1 wherein the polyfunctional dispersing agent is selected from the group consisting of:

phytic acid, ethylenediamine tetra(methylene phosphonic acid), hexamethylenediamine tetra(methylene phosphonic acid), diethylenetriamine penta(methylene phosphonic acid), amino tri(methylene phosphonic acid), N-(2-hydroxyethyl)ethylenedinitrilotris(methylene phosphonic acid), ethylenedinitrilotetrakis(methylene phosphonic acid), 1,6-hexamethylenedinitrlotetrakis(methylene phosphonic acid), 1,2-cyclohexanedinitrilotetrakis(methylenephosphonic acid), oxybis(ethylenetrilobis(methylenephosphonic acid), salts thereof, sulfur analogs of phytic acid and combinations thereof.

5. The rheology control agent of claim claim 1 wherein the pH of the slurry or dispersion of the phyllosilicate is about 7 or less and the source of multivalent cations is selected from the group consisting of calcite, dolomite, and magnesite.

6. The rheology control agent of claim 1 wherein the source of multivalent cations is selected from the group consisting of calcium acetate, calcium nitrate, calcium nitrite, calcium molybdate, calcium chromate, calcium tungstate calcium pertechnate, magnesium acetate, magnesium nitrate, magnesium nitrite, magnesium molybdate, magnesium chromate, magnesium tungstate, magnesium pertechnate, zinc acetate, zinc nitrate, zinc nitrite, zinc molybdate, zinc chromate, zinc tungstate, zinc pertechnate, aluminum acetate, aluminum nitrate, aluminum nitrite, aluminum molybdate, aluminum chromate, aluminum tungstate, aluminum pertechnate, zirconium acetate, zirconium nitrate, zirconium nitrite, zirconium molybdate, zirconium chromate, zirconium tungstate and zirconium pertechnate.

7. The rheology control agent of claim 1 wherein the amount of polyfunctional dispersing agent is about 1 to about 3 weight percent relative to the amount of phyllosilicate.

8. A method of modifying the viscosity of a liquid comprising dispersing a rheology control agent in a solvent wherein the rheology control agent comprises a phyllosilicate, a polyfunctional dispersing agent, and an effective amount of a viscosity modifier, wherein the viscosity modifier is a source of multivalent cations, about 20 to about 50 percent of the functional groups of the polyfunctional dispersing agent are associated with cations, and the polyfunctional dispersing agent and the effective amount of the viscosity modifier together are capable of raising the viscosity of a slurry or dispersion of the phyllosilicate.

9. The method of claim 8 wherein the phyllosilicate is selected from the group consisting of natural phyllosilicates, synthetic phyllosilicates, surface-modified phyllosilicates and combinations thereof.

10. The method of claim 8 wherein the polyfunctional dispersing agent is selected from the group consisting of:

phytic acid, ethylenediamine tetra(methylene phosphonic acid), hexamethylenediamine tetra(methylene phosphonic acid), diethylenetriamine penta(methylene phosphonic acid), amino tri(methylene phosphonic acid), N-(2-hydroxyethyl)ethylenedinitrilotris(methylene phosphonic acid), ethylenedinitrilotetrakis(methylene phosphonic acid), 1,6-hexamethylenedinitrlotetrakis(methylene phosphonic acid), 1,2-cyclohexanedinitrilotetrakis(methylenephosphonic acid), oxybis(ethylenetrilobis(methylenephosphonic acid), salts thereof, sulfur analogs of phytic acid and combinations thereof.

11. The method of claim 8 wherein the source of multivalent cations is selected from the group consisting of calcium acetate, calcium nitrate, calcium nitrite, calcium molybdate, calcium chromate, calcium tungstate calcium pertechnate, magnesium acetate, magnesium nitrate, magnesium nitrite, magnesium molybdate, magnesium chromate, magnesium tungstate, magnesium pertechnate, zinc acetate, zinc nitrate, zinc nitrite, zinc molybdate, zinc chromate, zinc tungstate, zinc pertechnate, aluminum acetate, aluminum nitrate, aluminum nitrite, aluminum molybdate, aluminum chromate, aluminum tungstate, aluminum pertechnate, zirconium acetate, zirconium nitrate, zirconium nitrite, zirconium molybdate, zirconium chromate, zirconium tungstate and zirconium pertechnate.

12. The method of claim 8 wherein the pH of the slurry or dispersion of the phyllosilicate is about 7 or less and the source of multivalent cations is selected from the group consisting of calcite, dolomite, and magnesite.

* * * * *